(12) United States Patent
Kitamura (10) Patent No.: US 7,916,317 B2
(45) Date of Patent: Mar. 29, 2011

(54) IMAGE FORMING DEVICE

(75) Inventor: Mitsuhiro Kitamura, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1126 days.

(21) Appl. No.: 11/383,493

(22) Filed: May 16, 2006

(65) Prior Publication Data

US 2007/0268508 A1 Nov. 22, 2007

(30) Foreign Application Priority Data

May 16, 2005 (JP) ................................ 2005-142875

(51) Int. Cl.
*G06K 15/00* (2006.01)
*G06F 3/12* (2006.01)

(52) U.S. Cl. ..................... 358/1.14; 358/1.13; 358/1.15; 358/1.16

(58) Field of Classification Search .................. 358/437, 358/1.1, 1.9, 1.13–1.17; 399/19, 87; 715/771
See application file for complete search history.

(56) References Cited

U.S. PATENT DOCUMENTS

| 6,850,995 B1 * | 2/2005 | Shishizuka et al. ............ 710/20 |
| 2003/0098989 A1 * | 5/2003 | Roos ............................ 358/1.14 |
| 2003/0227651 A1 * | 12/2003 | Mathieson ................... 358/1.16 |
| 2004/0012635 A1 * | 1/2004 | Imai et al. ..................... 345/771 |
| 2005/0151997 A1 * | 7/2005 | Murakami et al. .......... 358/1.16 |

FOREIGN PATENT DOCUMENTS

| JP | 11/168590 A | 6/1999 |
| JP | 2000-351259 A | 12/2000 |
| JP | 2001-333233 A | 11/2001 |
| JP | 2003/162387 A | 6/2003 |

* cited by examiner

*Primary Examiner* — James A Thompson
(74) *Attorney, Agent, or Firm* — Global IP Counselors, LLP (57) ABSTRACT

An image forming device is disclosed which includes an interrupt job display unit, an interrupt job selection unit, and an interrupt control unit. The interrupt job display unit will display details of an image forming job (an interrupt job) in an interrupt job window that is requested while another image forming job is being performed. The interrupt job selection unit allows an operator to permit or reject the execution of the interrupt job that is displayed on the interrupt job window. The interrupt control unit will execute the interrupt job if the operator permits the execution of the interrupt job. The interrupt job display unit displays interrupt job windows corresponding to a plurality of interrupt jobs that are requested while another image forming job is being performed. The interrupt job windows are displayed so as to overlap and be individually identifiable by an operator.

13 Claims, 11 Drawing Sheets

IMAGE FORMING DEVICE

CROSS-REFERENCE TO RELATED APPLICATIONS

This application claims priority to Japanese Patent Application No. 2005-142875. The entire disclosure of Japanese Patent Application No. 2005-142875 is hereby incorporated herein by reference.

BACKGROUND OF THE INVENTION

1. Field of the Invention

The present invention relates to an image forming device comprising an interrupt job display unit, an interrupt job selection unit, and an interrupt control unit. More specifically, the interrupt job display unit displays, in a window, an image forming job (an interrupt job) that is requested while another image forming job is being performed. The interrupt job selection unit allows an operator to selects whether or not to permit the execution of the interrupt job displayed by the interrupt job display unit. The interrupt control unit performs the interrupt job when an operator uses the interrupt job selection unit to permit the execution of the interrupt job.

2. Background Information

Generally, in an image forming device, if one or more other image forming jobs are requested while an image forming job is being executed, the newly requested image forming jobs are added to a waiting list in the order they are requested. Then, after the current image forming job is completed, the other image forming jobs in the waiting list are sequentially performed according to their order on the list (i.e., the first in/first out rule). However, even when printing has to be completed in a hurry, or even when an image forming job only requires one sheet to be printed, the newly requested image forming jobs cannot be performed until the current image forming job is completed. Therefore, conventional image forming devices have been inconvenient for users in this regard.

Figure 10:
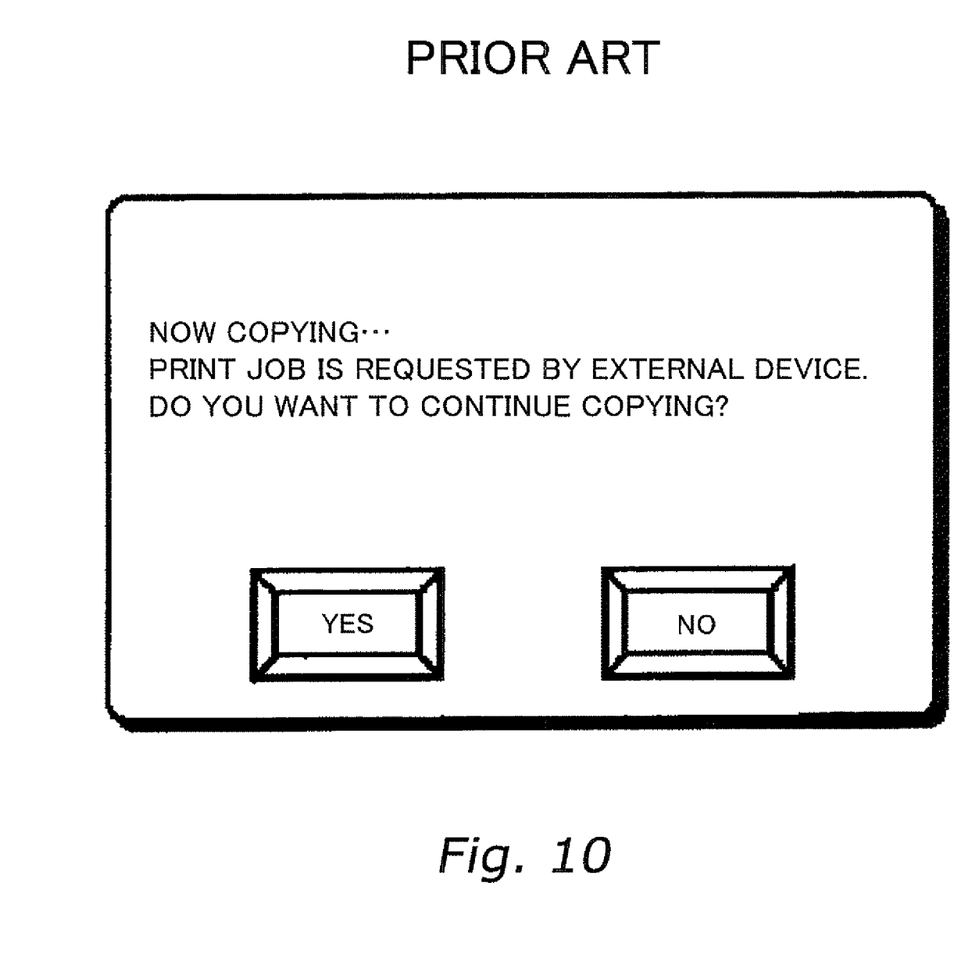
FIG. 10 illustrates the display of an interrupt job in the prior art.

In order to resolve the above described problem, Japan Patent Application Publications JP-A-11-168590 and JP-2003-162387 disclose image forming devices that can be commonly used with external devices, and which comprise a display unit, a selection unit, and a sequence control unit, respectively. As shown in FIG. 10, if a printing job is requested by an external device while a copying job is being executed, the display unit displays the fact that a printing job is being requested. The selection unit will present an operator with the option of accepting the interrupt request (i.e., the printing job) or the option of rejecting the interrupt request. If the operator, via the selection unit, selects the option of accepting the printing job, the sequence control unit terminates execution of the copy job, and executes the printing job of the interrupt request. On the other hand, if the operator selects the option of rejecting the printing job, the sequence control unit will continue with the current copy job.

In the above described conventional image forming device, even if an image forming job is being executed, the fact that another image forming job is being requested will be displayed. Because of this, the requested image forming job can be selectively performed, and thus functionality of the image forming device is enhanced. However, situations in which a plurality of image forming jobs are requested while an image forming job is being executed are not taken into consideration. Therefore, it is necessary to further improve the way interrupt jobs are displayed and selected from a plurality of other interrupt jobs.

For example, when a plurality of interrupt jobs are requested, interrupt job windows that show the interrupt jobs being requested, and allow an operator to input a selection in order to permit or reject the execution of the interrupt jobs, can be displayed on a touch panel display unit. However, when the interrupt job windows corresponding to the plurality of the requested interrupt jobs are displayed next to each other on the display unit, the number of the interrupt job windows will increase in accordance with the increase in the number of the image forming jobs requested. Because of this, it will be difficult to display a large number of interrupt job windows in a limited display area.

In addition, the interrupt job display unit can be set to display the interrupt job windows next to each other by reducing the display area of each of the interrupt job windows in accordance with the increase in the number of the interrupt jobs requested. In this situation, the area of each of the interrupt job windows may become too small when a large number of interrupt jobs are requested. Thus, it will be difficult to display the interrupt job windows in a way that allows an operator to accurately identify each.

In view of the above, it will be apparent to those skilled in the art from this disclosure that there exists a need for an improved image forming device, which is capable of displaying a plurality of image forming jobs in windows as interrupt jobs in a way that the display area of these windows are not limited to the extent that the windows are unrecognizable. This invention addresses this need in the art as well as other needs, which will become apparent to those skilled in the art from this disclosure.

SUMMARY OF THE INVENTION

In accordance with a first aspect of the present invention, an image forming device comprises an interrupt job display unit configured to display an interrupt job window, during the execution of an image forming job, that indicates that another image forming job is requesting permission to interrupt the execution of the current image forming job; an interrupt job selection unit configured to allow an operator to select whether or not to permit execution of the interrupt job indicated in the interrupt job window; and an interrupt control unit configured to execute the interrupt job when permitted by the operator via the interrupt job selection unit. The interrupt job display unit is capable of displaying a plurality of interrupt job windows corresponding to a plurality of interrupt jobs such that the interrupt job windows overlap with each other, and the plurality of interrupt job windows are individually identifiable by the operator in the overlapped state.

According to the first aspect of the present invention, if a plurality of image forming jobs are requested while another image forming job is being executed, the interrupt job display unit will display details of the plurality of image forming jobs in interrupt job windows, and the interrupt job windows will be displayed in an overlapping manner that allows each window to be individually identified by the operator. In addition, the interrupt job selection unit will allow the operator to select whether or not the interrupt jobs displayed on the interrupt job display unit are to be executed, and the interrupt control unit will execute the interrupt jobs when permitted by the operator via the interrupt job selection unit. In other words, compared to the above described situation in which a plurality of interrupt job windows are displayed next to each other, the same number and the same size of interrupt job windows can be simultaneously displayed in a small area with the present invention. Therefore, even if a plurality of interrupt job windows is displayed in a limited area, these windows can be displayed in a way that allows an operator to individually identify them.

In accordance with a second aspect of the present invention, in the image forming device according to the first aspect of the present invention, the interrupt job display unit displays the plurality of interrupt job windows so as to overlap from back to front in accordance with the order in which the plurality of interrupt jobs were requested.

According to the second aspect of the present invention, the interrupt job display unit displays the interrupt job windows so as to overlap from rear to front in accordance with the order in which the interrupt jobs were requested. Therefore, an operator can identify the requested order of the interrupt jobs. Furthermore, an interrupt job that has been more recently requested will be displayed in the foreground of the overlapping windows. Therefore, an operator can easily identify which interrupt job is the most recent.

In accordance with a third aspect of the present invention, in the image forming device according to the first aspect of the present invention, the interrupt job display unit displays the plurality of interrupt job windows so as to overlap from front to back in accordance with a predetermined priority of the plurality of interrupt jobs.

According to the third aspect of the present invention, the interrupt job display unit displays the interrupt job windows so as to overlap from front to back in accordance with a predetermined priority of the plurality of interrupt jobs. Therefore, an operator can easily identify the priority of the displayed interrupt jobs. In addition, the interrupt job with the highest priority will be displayed in the foreground. Therefore, an operator can easily identify the interrupt job with the highest priority.

In accordance with a fourth aspect of the present invention, the image forming device according to the first aspect of the present invention further comprises an interrupt job identification unit that identifies whether or not an image forming job is an interrupt job.

According to the fourth aspect of the present invention, the interrupt job identification unit only identifies interrupt jobs from amongst the image forming jobs requested while another image forming job is being executed, and the interrupt job display unit displays the interrupt jobs identified in interrupt job windows. Therefore, only image forming jobs that need to be executed with priority will be displayed in interrupt job windows, thereby further enhancing usability.

In accordance with a fifth aspect of the present invention, in the image forming device according to the first aspect of the present invention, each interrupt job window displayed by the interrupt job display unit comprises a task display region configured to display identification information that individually identifies each interrupt job; and a content display region configured to display information on each image forming job. Each interrupt job window is displayed so that at least the task display region thereof is individually identifiable by an operator.

According to the fifth aspect of the present invention, interrupt job windows are displayed such that each of the task display regions thereof can be identified. Therefore, an operator can easily identify an interrupt job window corresponding to an interrupt job that he/she intends to select.

In accordance with a sixth aspect of the present invention, in the image forming device according to the first aspect of the present invention, the interrupt job display unit will display an interrupt job window in the uppermost position of the plurality of overlapping interrupt job windows when selected by an operator.

According to the sixth aspect of the present invention, when one of the overlapping interrupt job windows is selected, the selected interrupt job window will be displayed in the foreground. Therefore, it is possible to easily identify an interrupt job by means of the detailed information on the interrupt job shown in the corresponding interrupt job window. Accordingly, the operability of the image forming device is further enhanced.

In accordance with a seventh aspect of the present invention, in the image forming device according to the fifth aspect of the present invention, the interrupt job selection unit comprises a selection key that is displayed on the content display unit; and a keystroke detection unit configured to detect a keystroke on the selection key.

According to the seventh aspect of the present invention, if an operator selects a selection key in order to permit execution of an interrupt job, the keystroke detection unit detects an operation corresponding to the selection key and the interrupt control unit executes the interrupt job. On the other hand, if an operator selects a selection key in order to reject execution of an interrupt job, the keystroke detection unit detects an operation corresponding to the selection key and the interrupt job will not be executed. In other words, the operator can select either to permit or reject the execution of an interrupt job by operation of the selection keys.

In accordance with an eighth aspect of the present invention, in the image forming device according to the seventh aspect of the present invention, the interrupt job display unit closes the interrupt job window when the key stroke detection unit detects a keystroke on the selection key thereon.

According to the eighth aspect of the present invention, when an operator operates a selection key, the keystroke detection unit detects an operation corresponding to the selection key and the interrupt job display unit closes the corresponding window. In other words, an interrupt job window will be closed after an operator has either permitted or rejected the execution of the interrupt job. Only interrupt job windows in which an operator has yet to permit or reject execution of the interrupt job will be displayed. Therefore, it is possible to greatly reduce the complexity in operating the interrupt job windows in which a selection is yet to be made.

In accordance with a ninth aspect of the present invention, in the image forming device according to the seventh aspect of the present invention, the interrupt job display unit will close the interrupt job window if the selection key thereon has not been operated for a predetermined period of time.

According to the ninth aspect of the present invention, if an operation is not performed with respect to an interrupt job window for a predetermined period of time, it will be closed. Therefore, an operator does not have to perform any operation with respect to the image forming jobs that he/she does not want to permit as interrupt jobs. Thus operability of the image forming device will be simplified.

In accordance with a tenth aspect of the present invention, in the image forming device according to the first aspect of the present invention, the interrupt job display unit will close an interrupt job window displayed prior to a newly displayed interrupt job window when the number of overlapping interrupt job windows displayed exceeds a predetermined number.

According to the tenth aspect of the present invention, if the number of the overlapping interrupt job windows displayed exceeds a predetermined number, the interrupt job window that was displayed first will be closed, and thereby maintain the number of the overlapping windows displayed at a constant level. Therefore, it is possible to simplify the display of the interrupt job windows.

In accordance with an eleventh aspect of the present invention, in the image forming device according to the first aspect of the present invention, the interrupt job display unit will close the rearmost displayed interrupt job window of the plurality of interrupt job windows when the number of overlapping interrupt job windows displayed exceeds a predetermined number.

According to the eleventh aspect of the present invention, if the number of the overlapping windows displayed exceeds a predetermined number, the rearmost interrupt job window displayed will be closed, and thereby maintain the number of the overlapping windows displayed at a constant level. Therefore, it is possible to simplify the display of windows.

As described above, the present invention is capable of providing an image forming device that is capable of performing such that, even if a plurality of image forming jobs are requested while another image forming job is being executed, the requested image forming jobs can be displayed in interrupt job windows as interrupt jobs without minimizing the display size of the interrupt job windows too greatly, and thereby allow each of the interrupt job windows to be individually identified by an operator.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
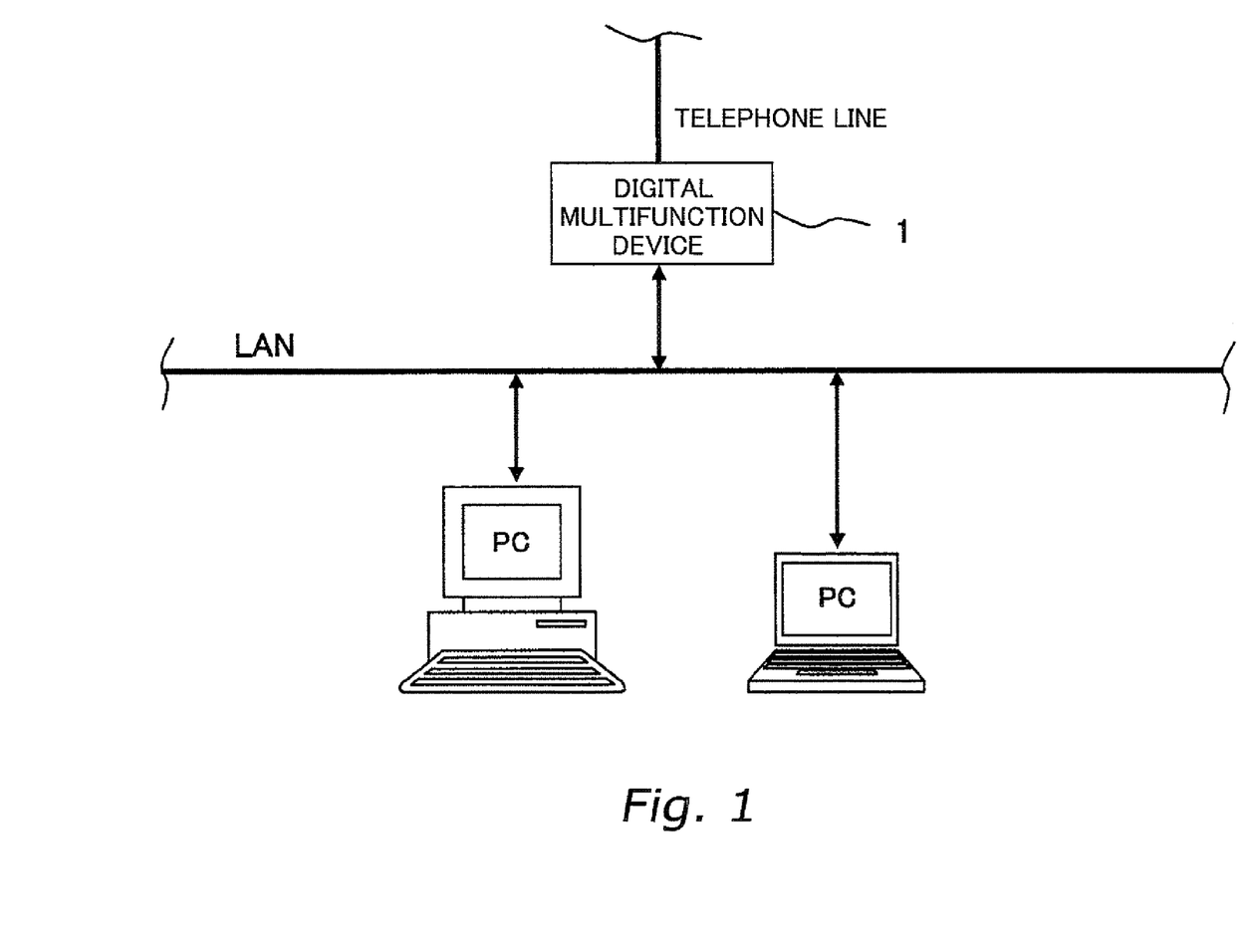
FIG. 1 is a schematic diagram of a network including a digital multifunction device in accordance with a first embodiment of the present invention.

A first embodiment of the present invention is hereinafter described, in which the present invention is applied to a digital multifunction device 1. As shown in FIG. 1, the digital multifunction device 1 is connected to a network such as a local area network (LAN) to which a plurality of personal computers (hereinafter called "PCs") are connected. The digital multifunction device 1 includes a plurality of functions, such as a printing function that executes a printing job requested by a PC through the LAN, a fax function that transmits image data to and receives image data from an external fax machine (not shown in the figure) via a telephone line, and a copy function that copies original documents.

Figure 2:
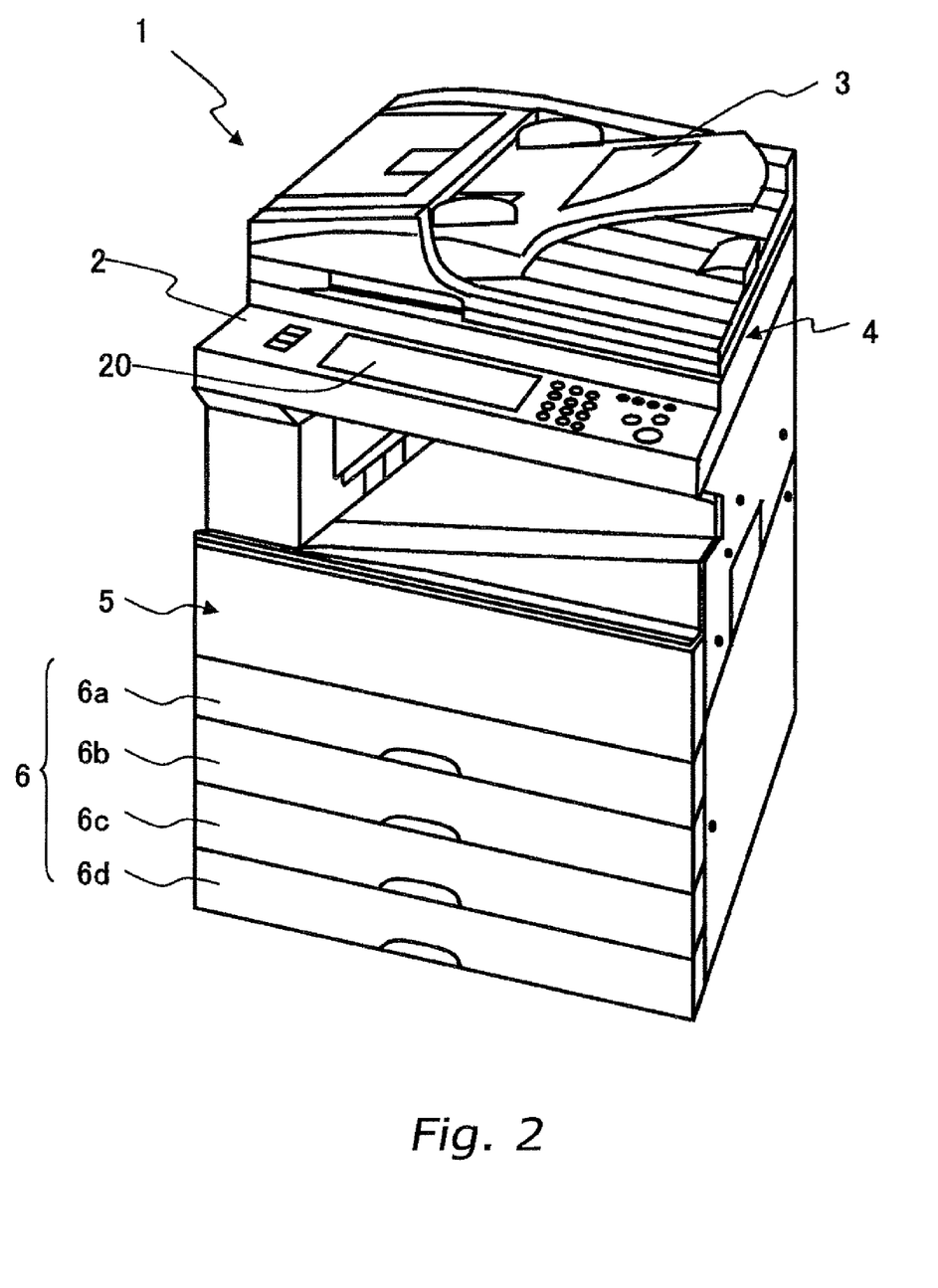
FIG. 2 is an exterior view of the digital multifunction device.

As shown in FIG. 2, the digital multifunction device 1 is comprised of an operation unit 2, an image scanning unit 4, an electrophotographic image forming unit 5, a feeding cassette unit 6, and a manual feeding unit (not shown in the figures). More specifically, a liquid-crystal touch panel 20 which displays a plurality of menu keys that specify options on a copy menu screen that will detect a keystroke corresponding to each of the menu keys, and a start key that actuates a copy operation with the configured copy menu, are arranged on the operation unit 2. The image scanning unit 4 sequentially scans original documents placed on an original document stacking unit 3, and converts the data printed or manually written/drawn on the original documents into electronic data. The electrophotographic image forming unit 5 is configured to form a toner image on a sheet of paper or other recording media based on image data that is converted into electronic data by the image scanning unit 4, image data transmitted from the external fax machines, and image data transmitted from PCs. The feeding cassette unit 6 includes feeding cassettes 6a, 6b, 6c, and 6d, which contain different sizes and different types of paper or other recording media. The manual feeding unit is arranged on the left side of the digital function device 1, and is not shown in the figures.

Figure 3:
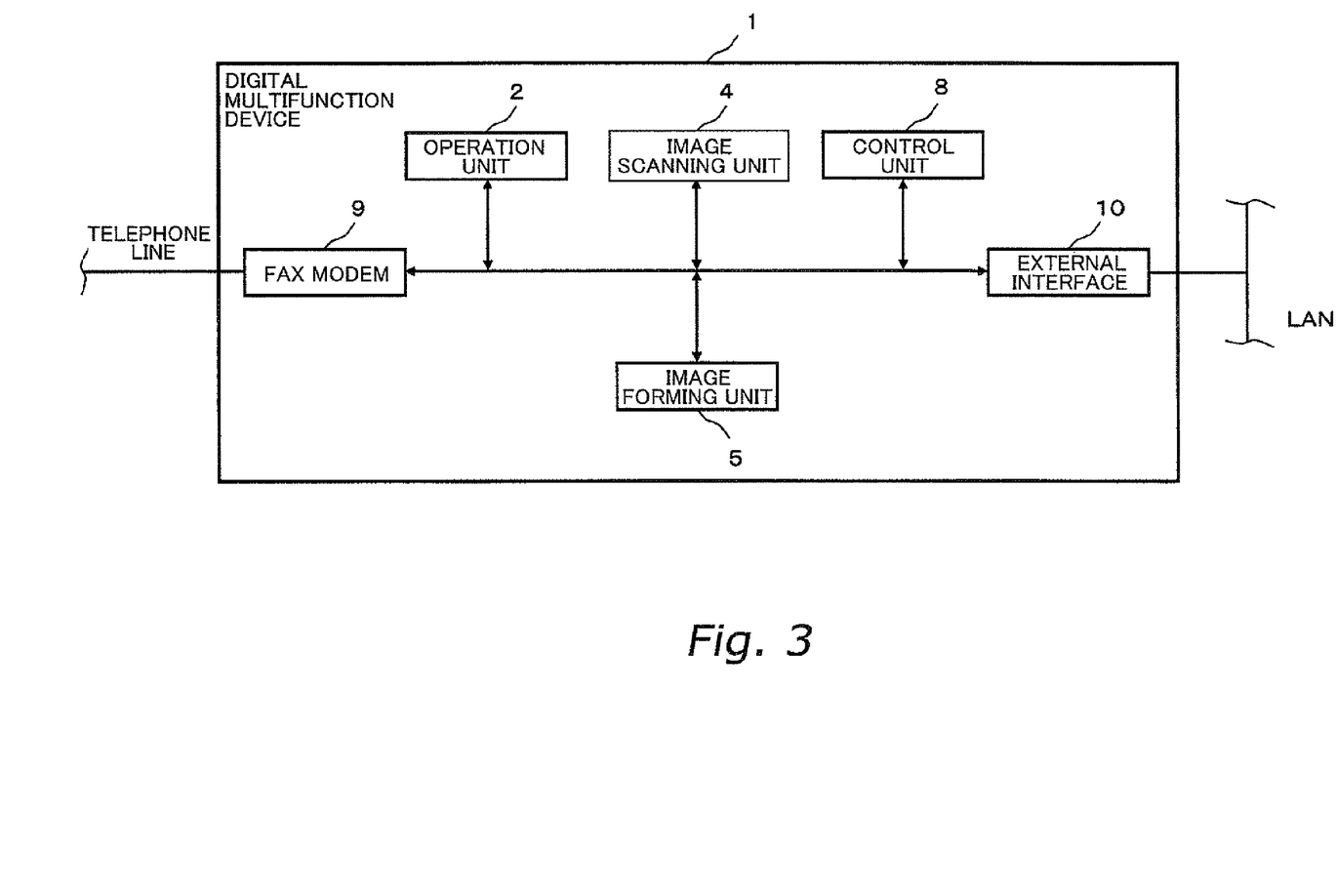
FIG. 3 is a functional block diagram of the digital multifunction device.

As shown in FIG. 3, in addition to the operation unit 2, the image scanning unit 4, and the image forming unit 5, the digital multifunction device 1 further comprises a fax modem 9 that transmits image data to and receives image data from external fax machines (not shown in the figures), an external interface 10 that is connected to a plurality of PCs through the LAN, and a control unit 8 that controls these units.

Figure 4:
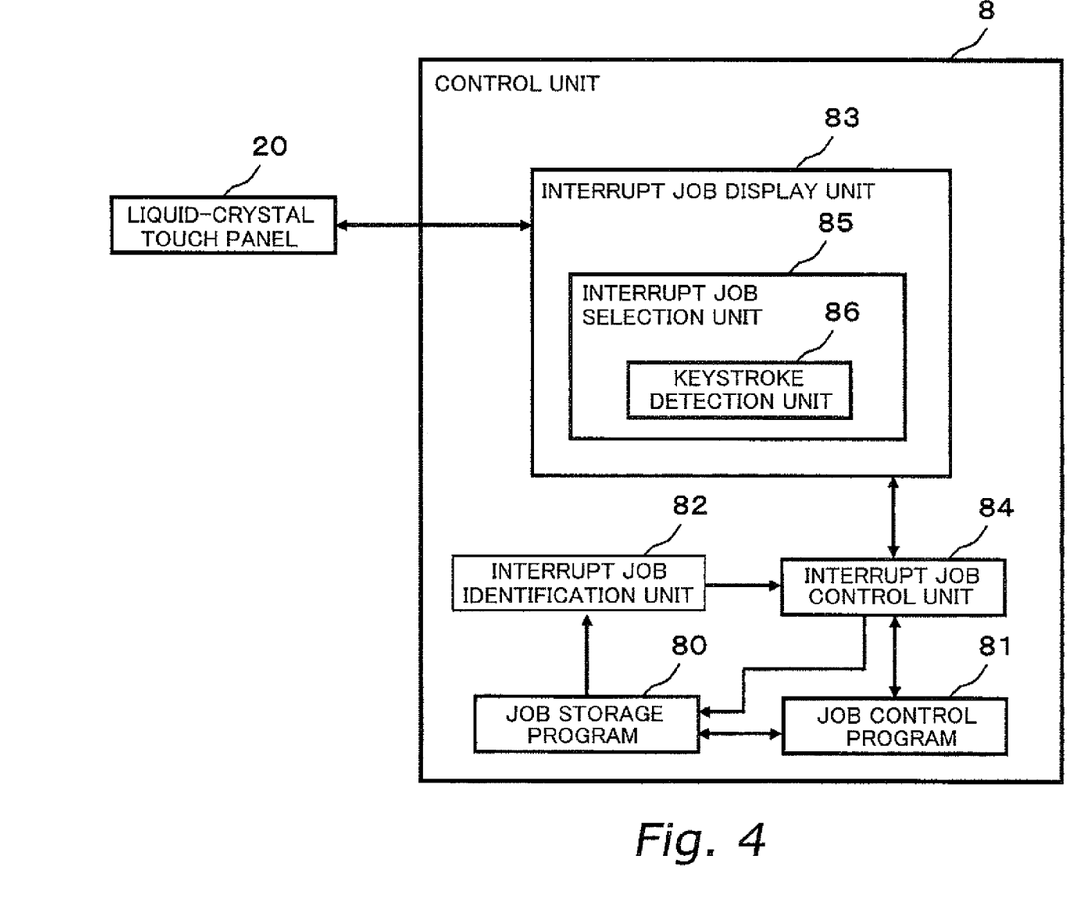
FIG. 4 is a functional block diagram of a control unit in the digital multifunction device.

The control unit 8 is comprised of a micro computer, a ROM in which control programs performed by the microcomputer are installed, and peripheral circuitry. FIG. 4 shows a functional block diagram of the main functions of the control unit 8 in accordance with the present invention, and are implemented by the above described microcomputer. The control unit 8 is comprised of a job storage unit 80, a job control unit 81, an interrupt job identification unit 82, an interrupt job control unit 84, an interrupt job display unit 83, an interrupt job selection unit 85, and a keystroke detection unit 86.

More specifically, the job storage unit 80 sequentially stores a plurality of image forming jobs in the order in which they were requested. The job control unit 81 transmits requests to execute the requested jobs stored in the job storage unit 80 to the image forming unit 5 and controls the progress of each of the image forming jobs. The interrupt job identification unit 82 identifies whether or not an image forming job that was requested while another image forming job is being performed, and stored in the job storage unit 80, is an interrupt job. The interrupt job control unit 84 controls the interrupt job identified by the interrupt job identification unit 82. The interrupt job display unit 83 displays the interrupt job that is controlled by the interrupt job control unit 84 in an interrupt job window displayed on the liquid-crystal touch panel 20. The interrupt job selection unit 85 will allow an operator to either permit or reject execution of the interrupt job displayed by the interrupt job display unit 83. In addition, the interrupt job control unit 84 transmits a request to execute the interrupt job selected by the interrupt job selection unit 85 to the job control unit 81. In other words, an interrupt control unit that executes an interrupt job is comprised of the interrupt job control unit 84 and the job control unit 81.

The job storage unit 80 stores job data related to the image forming job requested by PCs. The job data includes the user name of a PC that transmits a request to execute a job, the date and time the job is requested, the paper size, the number of papers to be printed, image data, job data related to an image forming job requested via the operation unit 2, and job data corresponding to fax data received through the telephone line.

The interrupt job identification unit 82 includes an interrupt job identification table that is used in order to identify whether an image forming job stored in the job storage unit 80 is an interrupt job. The interrupt job identification unit 82 transmits control data for the image forming job that is determined to be an interrupt job based on the data stored in the interrupt job identification table to the interrupt job control unit 81. Here, a portion of the job data by which each of the image forming jobs can be identified, and interrupt priority data to be described more in detail below, are the control data. The interrupt job control unit 81 controls the interrupt job display unit 83 in order to display the received interrupt job. Then, if an operator accepts the execution of interrupt processing via the interrupt job selection unit 85, and an interrupt job identified by the interrupt job control unit 81 is executed, the interrupt job control unit 81 will embed an interrupt flag in the corresponding image forming job stored in the job storage unit 80.

The job control unit 81 executes and controls the image forming process with respect to a plurality of image forming jobs stored in the job storage unit 80 in the order they were requested, and deletes the job data that has been executed. Here, when an image forming job in which an interrupt flag is embedded is identified, the current image forming job will be temporarily interrupted, and the image forming job in which the interrupt flag is embedded will be performed and controlled as a priority job.

The interrupt flag is comprised of an interrupt counter that represents the interrupt priority. Here, a normal process is expressed by a interrupt counter value of "0", and an interrupt process is expressed by a interrupt counter value of other than "0." In addition, the bigger the value, the higher the priority. For example, if an image forming job having an interrupt counter value of "1" is requested while another image forming job is being performed, the current image forming job will be temporarily interrupted, and the interrupt job will be performed first, if the interrupt counter value of the current image forming job is "0". On the other hand, if an image forming job (an interrupt job) having an interrupt counter value of "2" is requested while an image forming job (an interrupt job) having an interrupt counter value of "1" is being performed, the current interrupt job having an interrupt counter value of "1" will be temporarily interrupted, and the interrupt job having an interrupt counter value of "2" will be performed as a priority job. When the current interrupt job (having an interrupt counter value of "2") is completed, the temporarily interrupted interrupt job (having an interrupt counter value of "1") will be resumed. Then, when the temporarily interrupted interrupt job (having an interrupt counter value of "1") is completed, the temporarily interrupted image forming job (having an interrupt counter value of "0") will be resumed. Thus, multi-interrupt processing can be performed.

The interrupt job identification table is pre-configured through the operation unit 2 by an administrator of the digital multifunction device 1, and can be comprised of interrupt job data that specifies the image forming jobs that will be interrupt jobs, and interrupt priority data. Interrupt job data can be any data that can specify a job, and includes jobs from each of the functional units, such as copying, printing, and faxing, requested through an interrupt key arranged in the operation unit 2, requested by a PC, or requested by a fax. In addition, when a job is requested by a PC, the interrupt job data can include the name of the PC or the user name of the source that transmits the request to execute a job, the name of an image file, the number of pages to be printed, the paper size, and the type of paper. When a job is requested from a fax, the interrupt job data can include the telephone number of the source from which the fax was sent. Furthermore, it is possible to specify three levels of interrupt priority for each interrupt job data. However, it should be understood that the interrupt priority data is not limited to three-level priority data, and it may be configured differently in accordance with need. The present embodiment will be hereinafter described based on the assumption that the interrupt job data is an image forming job requested by a PC connected to a network.

Figure 5A:
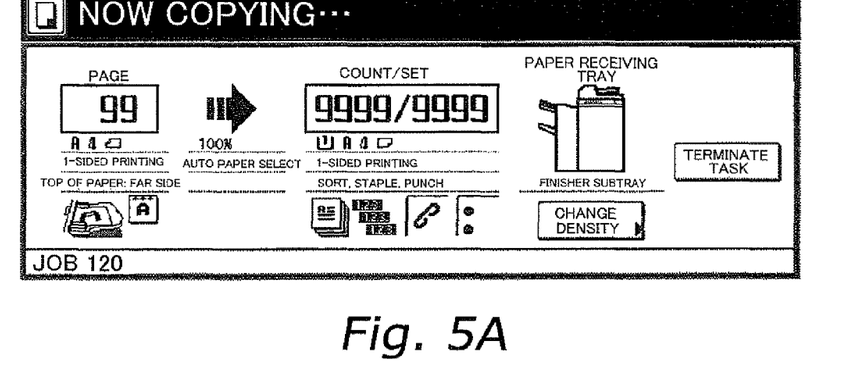
FIG. 5A shows a liquid-crystal touch panel on the digital multifunction device that indicates that a copy job being performed.

As shown in FIG. 5A, a menu screen is displayed on the liquid-crystal touch panel 20. An operator can select the basic copy menu on the menu screen, which includes the number of copies, the paper size, copy magnification, the copy receiving tray, and sorting. Here, while an image forming job is being performed, the message "NOW COPYING . . . " is shown.

Figure 5B:
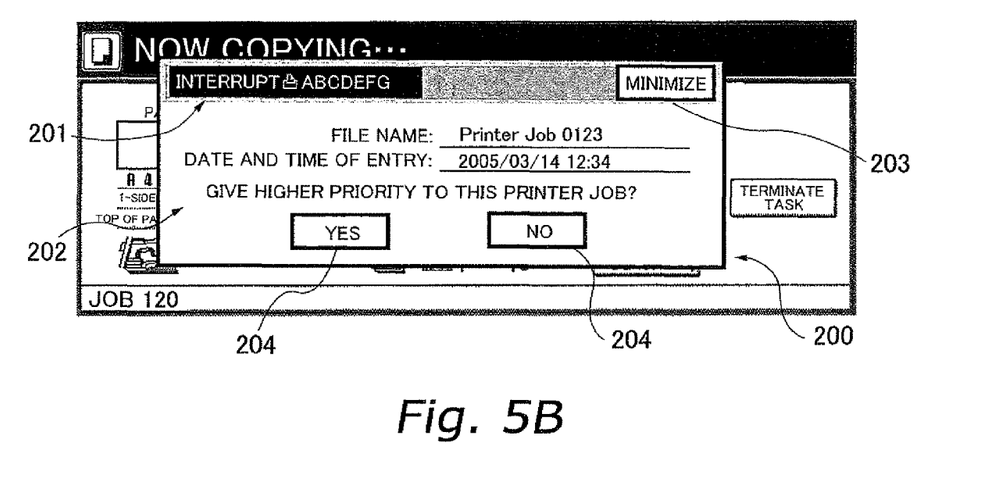
FIG. 5B shows a liquid-crystal touch panel on which an interrupt job window is displayed.

As shown in FIG. 5B, when a plurality of user names comprised of combinations of characters are registered in the interrupt job identification table as interrupt job data, and predetermined interrupt priority data is configured for each of the user names, the interrupt job display unit 83 will display an interrupt job in the interrupt job window 200, based on a command from the interrupt job control unit 84, if the interrupt job identification unit 82 identifies an interrupt job from a plurality of jobs stored in the job storage unit 80.

The interrupt job window 200 is comprised of a task display region 201 and a content display region 202. The task display region 201 shows information that will individually identify the interrupt job. The content display region 202 shows detailed information on an image forming job. More specifically, the task display region 201 shows identification information, such as an icon specifying the interrupt job requested by a PC and the user name "ABCDEFG." On the other hand, the content display region 202 displays the file name, a portion of the job data such as the date and time of entry (i.e., the date and time when the image forming job was requested), and selection keys 204 comprised of a "YES" key and a "NO" key that allows an operator to permit or reject execution of the interrupt job.

Figure 5C:
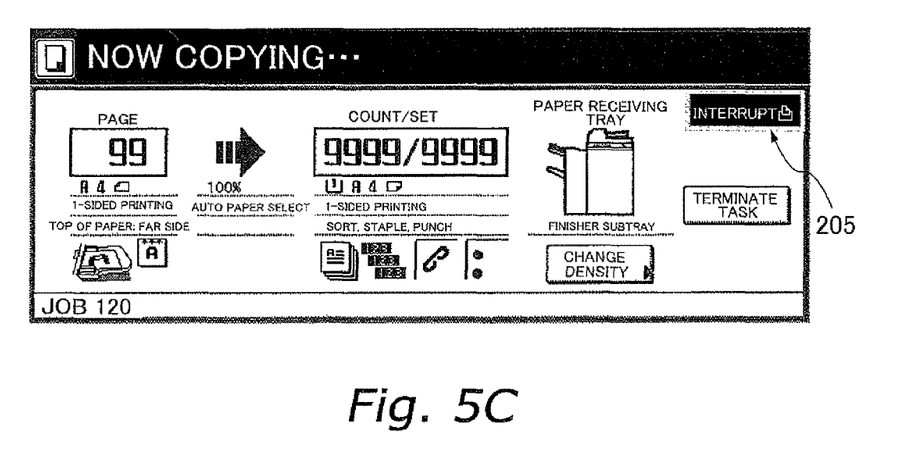
FIG. 5C shows a liquid-crystal touch panel on which the interrupt job window is displayed in a minimized state.

In addition, as shown in FIG. 5B, a minimize key 203 is displayed on the task display region 201. When the minimize key 203 is pressed by an operator, the interrupt job window 200 will be minimized as shown in FIG. 5C, in which a minimized display key 205 is displayed on the upper right portion of the liquid-crystal touch panel 20. The minimized display key 205 indicates that the interrupt job window 200 is being displayed in a minimized size and not deleted. If the minimize display key 205 is selected (e.g., pressed), the interrupt job display unit 83 redisplays the interrupt job window 200 as shown in FIG. 5B.

The interrupt job selection unit 85 is comprised of the selection keys 204 and the keystroke detection unit 86 that detects keystrokes from each of the selection keys 204. When the "YES" key is selected from the selection keys 204, the requested job is selected as an interrupt job. On the other hand, when the "NO" key is selected from the selection keys 204 (i.e., performing jobs in the normal requested order is selected), the requested job will be canceled, and this information is transmitted to the interrupt job control unit 84. Then, the interrupt job display unit 83 closes the interrupt job window 200.

When the interrupt job control unit 84 is informed by the interrupt job selection unit 85 that execution of an interrupt job has been permitted, it embeds an interrupt flag in the job data corresponding to the image forming job stored in the job storage unit 80, and informs the control unit 81 that an interrupt job has been permitted. Then, based on this information, the job control unit 81 executes and controls the image forming job corresponding to the job data in which the interrupt flag is embedded.

Figure 6A:
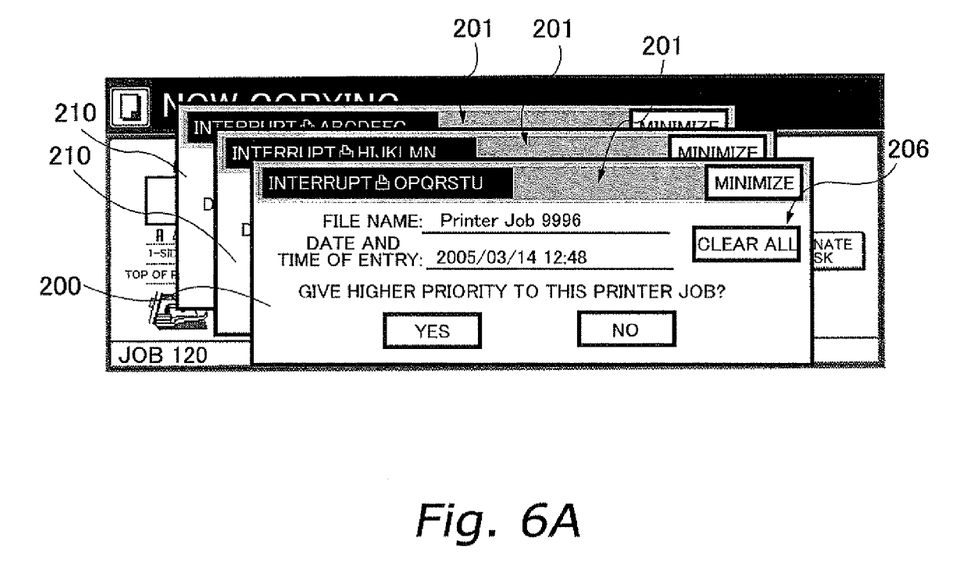
FIG. 6A shows a liquid-crystal touch panel on which three interrupt job windows are displayed.

As shown in FIG. 6A, if a plurality of image forming jobs are requested while a normal image forming job or an interrupt job is being performed, and these image forming jobs are identified as interrupt jobs by the interrupt job identification unit 82, the interrupt job display unit 83 displays a plurality of interrupt job windows 200 corresponding to these interrupt jobs so as to overlap with each other, and so that that each of the task display regions 201 of these windows can be individually identified.

Here, the interrupt job display unit 83 displays the plurality of the interrupt job windows 200 so as to overlap from front to back according to the priority of the requested interrupt jobs (i.e., the interrupt priority data). If the priority data has not yet been set at this point, or if the priority data are all equal, the requested interrupt jobs are displayed so as to overlap from back to front according to the requested order.

Figure 6B:
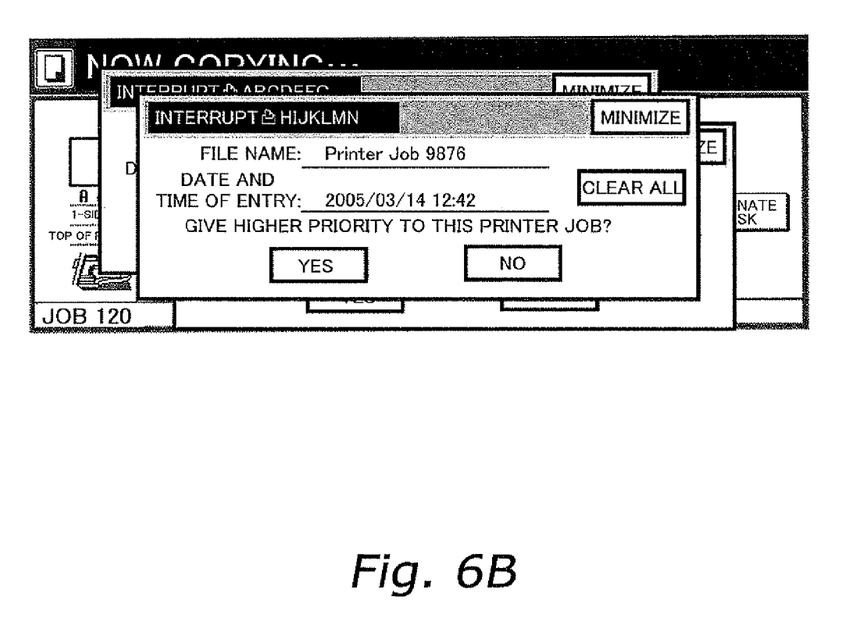
FIG. 6B shows a liquid-crystal touch panel on which the second of the three interrupt windows shown in FIG. 6A is pressed.

If an interrupt job window 210 that is displayed behind the interrupt job window 200 shown in FIG. 6A is pressed by an operator, the interrupt job display unit 83 updates the display so that the interrupt job window 210 that was pressed is displayed in the foreground as shown in FIG. 6B.

Furthermore, the interrupt job display unit 83 displays a "clear all" key 206 on the content display region 202 of the interrupt job window 200 displayed on the foreground. If the "clear all" key 206 is pressed, all the interrupt job windows 200 displayed on the liquid-crystal touch panel 20 will be closed, and the interrupt jobs corresponding to the closed windows will be canceled (i.e., executing jobs in the normal requested order is selected).

In addition, when the number of the overlapping interrupt job windows 200 displayed exceeds a predetermined number, the interrupt job display unit 83 will close the rearmost interrupt job window displayed in order to display a new interrupt job window. In addition, when a keystroke is not executed by an operator with respect to a displayed interrupt job window for a predetermined period of time, the interrupt job display unit 83 will close the corresponding window. Therefore, it is possible to avoid an unnecessary increase in the number of overlapping interrupt job windows 200 displayed. Here, it is also possible to close the uppermost interrupt job window displayed in order to display a new interrupt job window if the number of the overlapped interrupt job windows displayed exceeds a predetermined number.

Referring to the flow chart shown in FIG. 7, the interrupt process will be hereinafter described in detail. Here, the interrupt process will be performed if a print job (i.e., one of the image forming jobs) is requested by a PC while a copy job (i.e., the other image forming job) is being performed by the digital multifunction device 1.

Figure 7A:
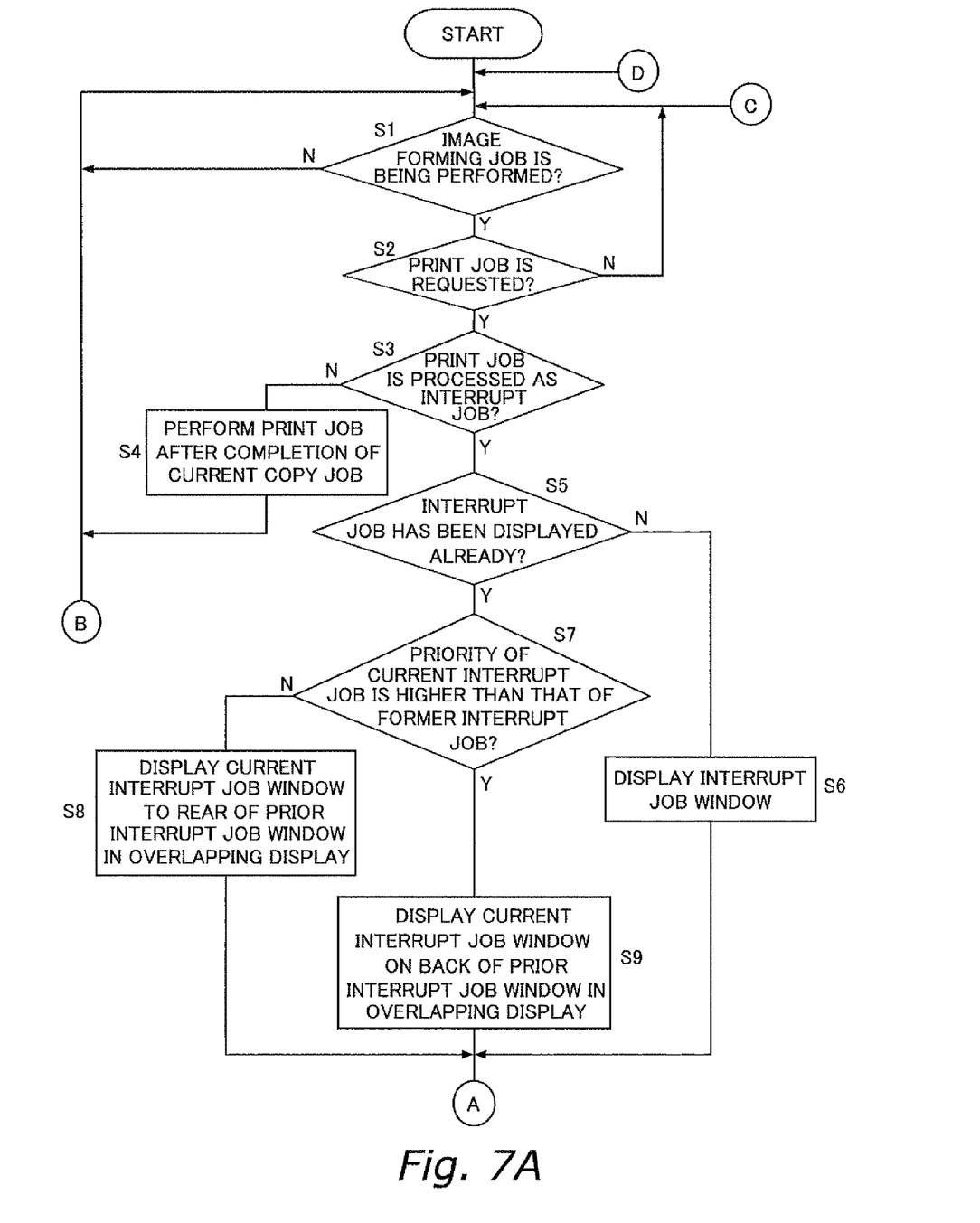
FIGS. 7A and 7B is a flow chart showing a series of interrupt processing steps of a print job.
Figure 7B:
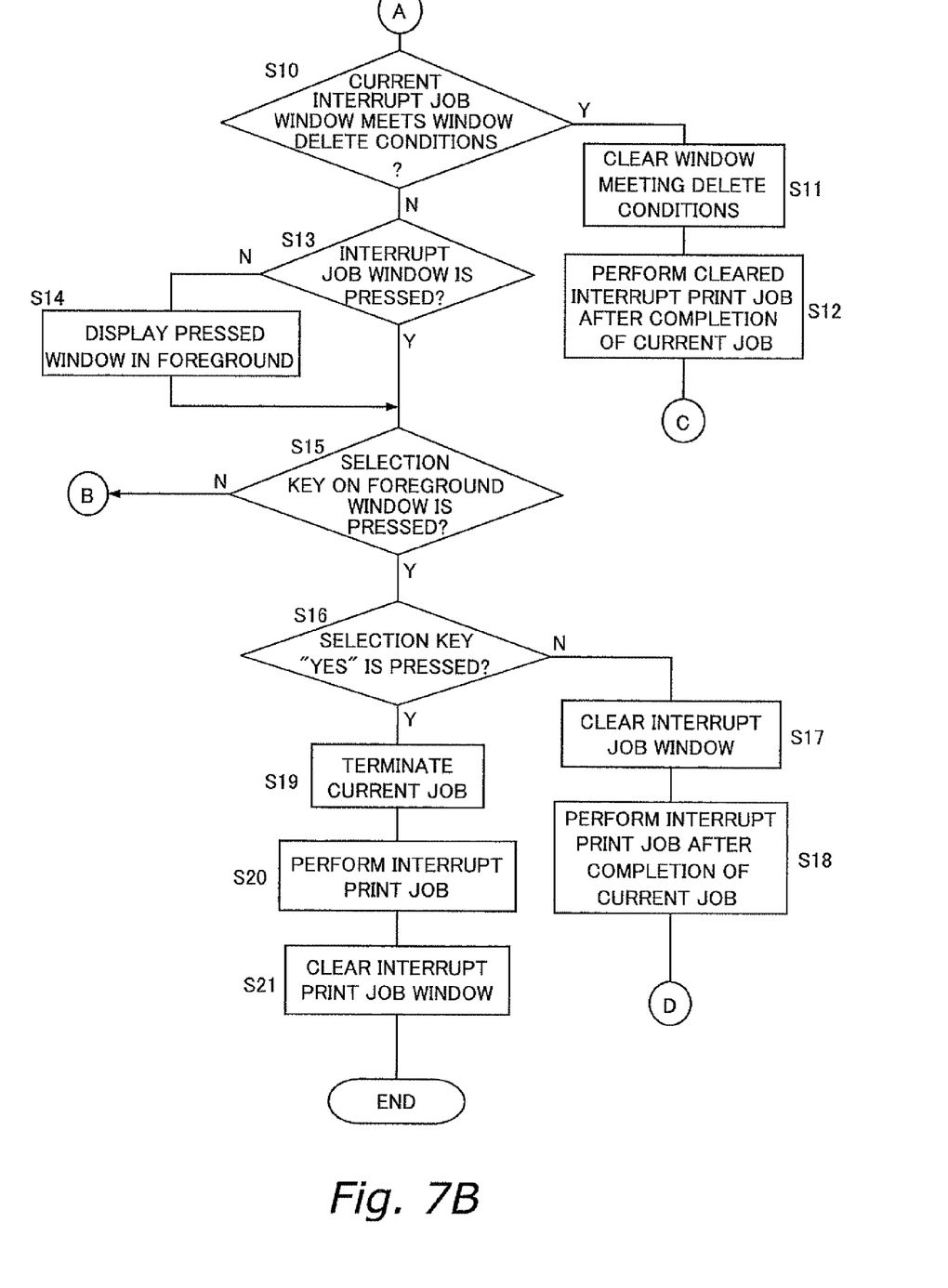

As shown in FIG. 7, when an image forming job (i.e., a copy job) is being performed (step S1), it will be determined whether or not another image forming job (i.e., a print job) has been requested by a PC (step S2). If a print job has been requested by a PC while the copy job is being performed, the job control unit 81 will store the job data in the job storage unit 80, and the interrupt job identification unit 82 will determine if the print job is classified as an interrupt job based on the stored job data (step S3). If the print job is not classified as an interrupt job, the print job will be performed after the current copy job has been completed (step S4). In other words, an interrupt process will not be executed here. On the other hand, if the print job is classified as an interrupt job, it will be determined whether or not the interrupt job display unit 83 has already displayed an interrupt job window (step S5). If an interrupt job window has not yet been displayed, an interrupt job window 200 corresponding to the print job will be displayed (step S6).

If an interrupt job window (hereinafter called the interrupt job window 200) has already been displayed, the priority between the later requested interrupt job corresponding to the displayed interrupt job window 200 and the current interrupt job is determined based on the priority data (step S7). If the priority of the current interrupt job is lower than the priority of the later requested interrupt job corresponding to the displayed interrupt job window 200, an interrupt job window corresponding to the current interrupt job will be displayed to the rear of the interrupt job window 200 of the later requested interrupt job, and the task display regions 201 of the overlapped interrupt job windows will not overlap (step S8). On the other hand, if the priority of the current interrupt job is higher than the priority of the later requested interrupt job corresponding to the displayed interrupt job window 200, the interrupt job window corresponding to the current interrupt job will be displayed in front of the interrupt job window 200 of the later requested interrupt job, and the task display regions 201 of the overlapped interrupt job windows will not overlap (step S9).

Then, it will be determined whether or not the current interrupt job window 200 of the later requested interrupt job fulfills a window clear condition (step S10). Here, the window clear conditions are whether or not the "clear all" key 206 has been selected or not, and whether or not the number of overlapping interrupt job windows that have been displayed exceeds a predetermined number. If the current interrupt job window fulfills either of the window clear conditions, the interrupt job window that was displayed in the background or the interrupt job window that was displayed in the foreground will be closed (step 11), and the interrupt job corresponding to the closed window will be canceled (step S12). Here, in step S11, if the "clear all" key 206 is pressed, all the interrupt job windows will be closed. In other words, an interrupt flag cannot be embedded here so as to allow the canceled image forming job to be performed after the current image forming job is completed.

On the other hand, in step S10, if the interrupt job window 200 does not fulfill the window clear conditions, it will be determined whether or not the interrupt job window 200 displayed to the rear of the interrupt job window 210 was pressed or not (step S13). If the interrupt job window 200 was pressed, the display of the screen will be updated so that the interrupt job window 200 will be shown in the foreground (step S14).

Then, it will be determined whether or not the selection keys 204 of the interrupt job window displayed in the foreground were pressed or not (step S15). Here, if the "NO" key of the selection keys 204 is pressed (step S16), the interrupt job window will be closed (step S17), and the interrupt job corresponding to the closed window will be canceled (step S18). In other words, the canceled interrupt job will be performed after the current image forming job has been completed. On the other hand, if the "YES" key of the selection keys 204 is pressed, the interrupt job control unit 84 will embed an interrupt flag in the interrupt job stored in the job storage unit 80, and the job control unit 81 will temporarily interrupt the current image forming job (step S19). Then, the interrupt print job will be executed (step S20), and the interrupt job window will be closed (step S21). The job control unit 81 will resume the temporarily interrupted image forming job after the interrupt printing job is completed.

If the current image forming job controlled by the job control unit 81 is completed while the interrupt job window displayed by the interrupt job display unit 83 remains unselected, the job control unit 81 performs and controls the other image forming jobs stored in the job storage unit 80 in the requested order. Here, the interrupt job windows will be closed based on commands from the interrupt job control unit 84.

Second Embodiment

Figure 8A:
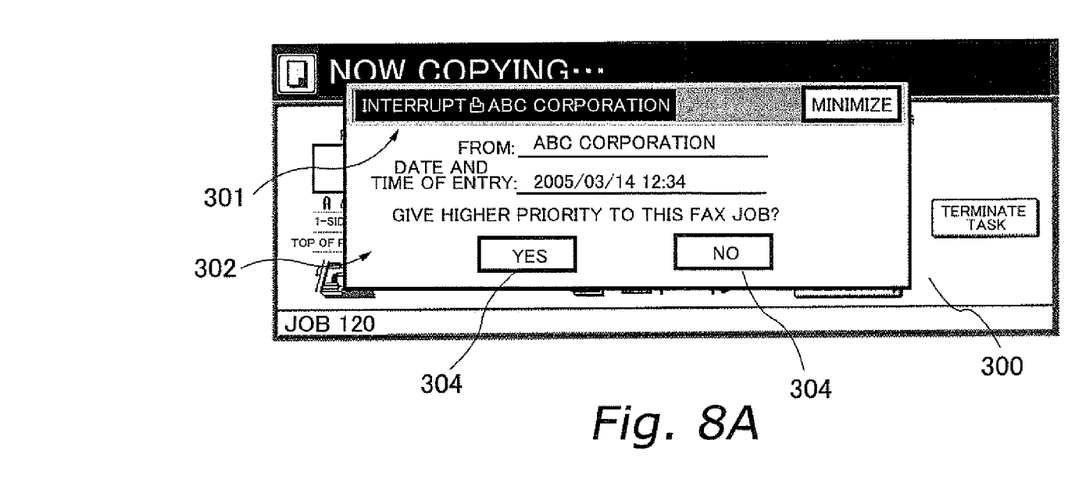
FIG. 8A shows a liquid-crystal touch panel on which an interrupt fax job window is displayed.
Figure 8B:
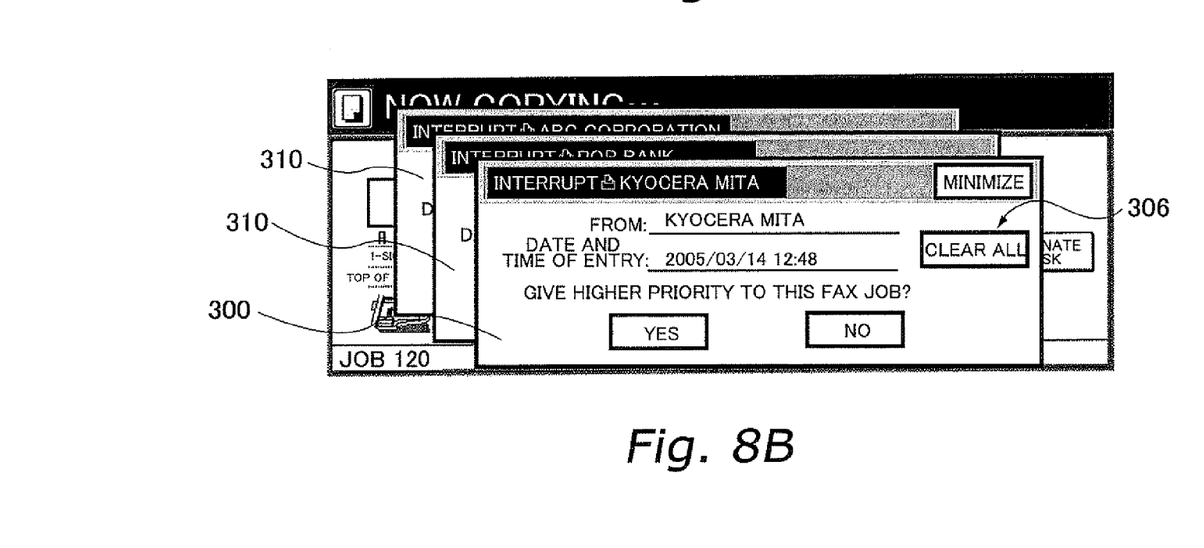
FIG. 8B shows a liquid-crystal touch panel on which three interrupt fax job windows are displayed.
Figure 9:
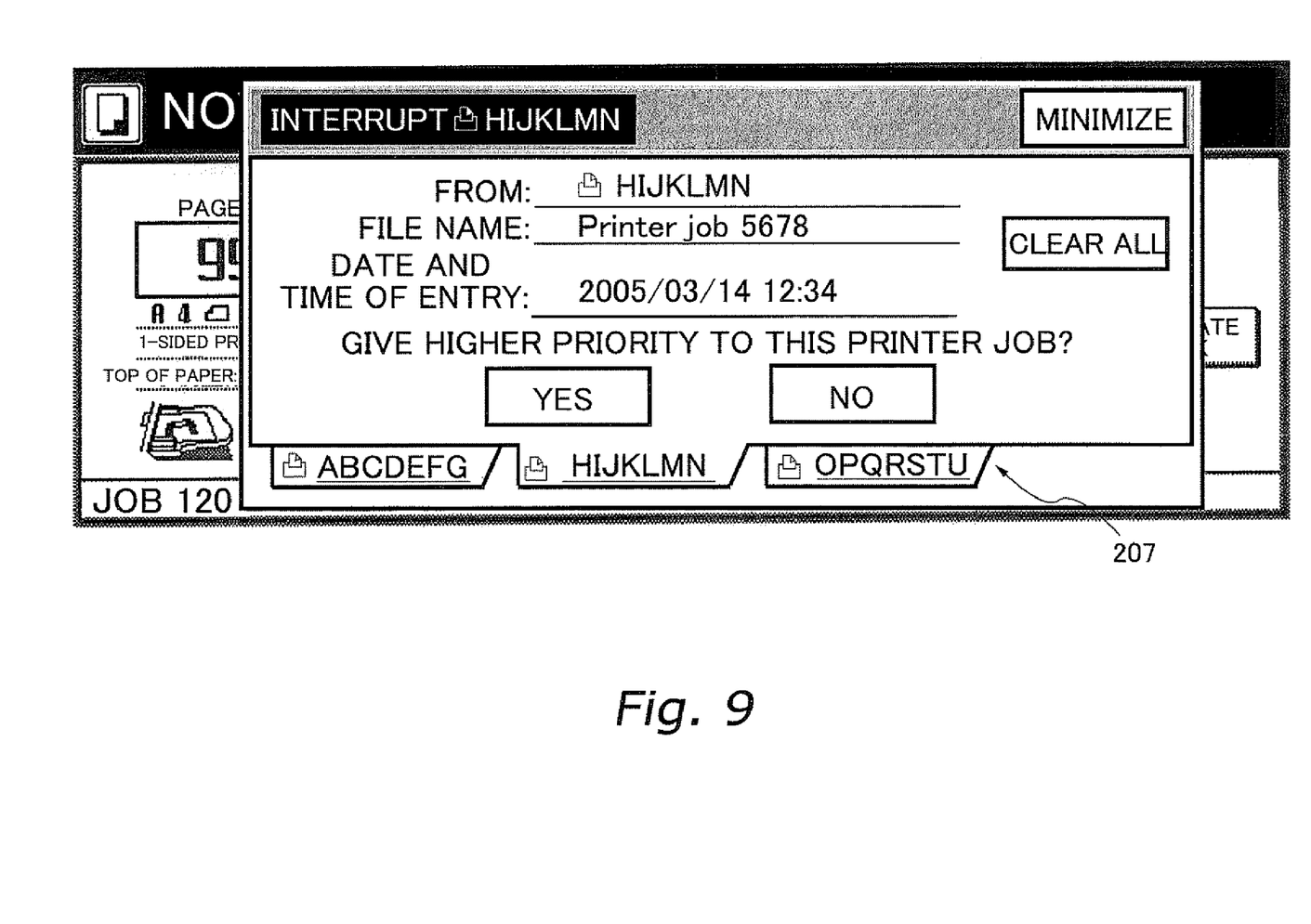
FIG. 9 shows a liquid-crystal touch panel on which an interrupt job window is displayed using tabs.

Referring now to FIGS. 8A, 8B, and 9, an image forming device in accordance with a second embodiment of the present invention will now be described. In view of the similarity between the first and the second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment of the present invention, a situation was described in which an interrupt process is performed if a print job (i.e., one of the image forming jobs) is requested by a PC while a copy job (i.e., the other image forming job) is being performed by the digital multifunction device 1. However, the present invention is not limited to this example. For example, the interrupt control processing in accordance with the present invention can be applied to a situation in which a fax message is received from external devices while an image forming job is being performed, a situation in which an interrupt key is selected on the operation unit 2 while an image forming job is being performed, or a combination of these situations.

More specifically, when interrupt control is performed with respect to a fax job, the user name of the source of the fax message that was transmitted, the fax number, or the number of pages in the fax message, can be used as the data stored in the interrupt job identification table. In addition, a fax received from a specific source or a fax having a fewer number of pages can be set as interrupt jobs. Furthermore, it is possible to configure a setting so that a fax received in a "memory receiving mode" in which fax data is stored in memory, or a fax received in a "confidential receiving mode" in which fax data is sent to and stored in a private mail box protected by a user ID or a password, can be excluded from the interrupt jobs. An example is given below, and shown in FIG. 8A.

As shown in FIG. 8A, the name of the company from which a fax has been sent, and identification information such as an icon showing that the current job is a fax job, are displayed on the task display region 301 of the interrupt job window 300. In addition, a portion of the job data such as the date and time when the fax data was received and the number of pages to be printed, and both YES and NO selection keys 304, are displayed on the content display region 302 of the interrupt job window 300.

As shown in FIG. 8B, if a plurality of interrupt jobs have been requested, interrupt job windows corresponding to the plurality of the interrupt jobs are displayed so as to overlap in a way that each of the windows are identifiable. The interrupt job windows can be displayed so as to overlap in accordance with the interrupt priority or the requested order. These display methods are the same as the methods in the above described first embodiment of the present invention.

In the above described first embodiment of the present invention, a situation was described in which the interrupt job display unit displays a plurality of interrupt job windows so that the task display regions do not overlap with each other. However, the present invention is not limited to this. For example, the present invention may adopt the tab method shown in FIG. 9. In this tab method, identification information that makes it possible to distinguish a plurality of interrupt job windows from each other is displayed in a plurality of tabs. In this case, the tabs may serve as the task display regions, and the display screen of the selected tab 207 may serve as the content display region. Furthermore, control such as the selection and deletion of each of the tab screens may be performed as described in the first embodiment of the present invention.

In the above described first embodiment of the present invention, a situation was described in which the interrupt identification unit determines whether or not a requested job is classified as an interrupt job, and identifies the priority of the interrupt jobs based on the interrupt job identification table comprised of interrupt job data and interrupt priority data. However, the present invention is not limited to this example. For example, if the priority of the interrupt jobs is not configured, the interrupt jobs may be executed in the order in which they are requested. In addition, if the interrupt job data is not configured, all the image forming jobs that are requested while another image forming job is being performed may be classified as interrupt jobs.

Furthermore, the interrupt job window can be displayed by the interrupt job display unit 83 when the interrupt job identification unit identifies a requested job as an interrupt job. However, the interrupt job window can be displayed only when an operation has not been performed with the operation unit 2 for a predetermined period of time. This solves the problem in which an interrupt job window suddenly appears while the operation unit 2 is being operated, which makes it difficult for an operator to select other menu items.

In addition, in the above described first embodiment of the present invention, a situation was described in which a plurality of print jobs is requested while a copy job is being performed. However, the present invention is not limited to this example. For example, the present invention can be applied to a situation in which a plurality of print jobs and/or copy jobs are requested while another print job is being performed, or a situation in which a plurality of print jobs and/or fax jobs are requested while another fax job is being performed.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image forming device, comprising:
   an interrupt job display unit displaying an interrupt job window that indicates that another image forming job is requesting permission to interrupt the execution of the current image forming job when the execution of an image forming job is occurred;
   an interrupt job selection unit configured to allow an operator to select whether or not to permit execution of the interrupt job indicated in the interrupt job window; and
   an interrupt control unit configured to execute the interrupt job when permitted by the operator via the interrupt job selection unit;
   an interrupt job identification unit configured to identify whether or not an image forming job is an interrupt job based on data stored in an interrupt job identification table;
   the interrupt job display unit is configured to display a plurality of interrupt job windows corresponding to a plurality of interrupt jobs such that the interrupt job windows overlap with each other, and the plurality of interrupt job windows are individually identifiable by the operator in the overlapped state.

2. The image forming device according to claim 1, wherein the interrupt job display unit displays the plurality of interrupt job windows so as to overlap from back to front in accordance with the order in which the plurality of interrupt jobs were requested.

3. The image forming device according to claim 1, wherein the interrupt job display unit displays the plurality of interrupt job windows so as to overlap from front to back in accordance with a predetermined priority of the plurality of interrupt jobs.

4. The image forming device according to claim 1, wherein each interrupt job window displayed by the interrupt job display unit includes
   a task display region configured to display identification information that individually identifies each interrupt job; and
   a content display region configured to display information on each image forming job;
   wherein each interrupt job window is displayed so that at least the task display region thereof is individually identifiable by an operator.

5. The image forming device according to claim 4, wherein the interrupt job selection unit includes
   a selection key that is displayed on the content display unit; and
   a keystroke detection unit configured to detect a keystroke on the selection key.

6. The image forming device according to claim 5, wherein the interrupt job display unit closes the interrupt job window when the keystroke detection unit detects a keystroke on the selection key thereon.

7. The image forming device according to claim 5, wherein the interrupt job display unit will close the interrupt job window if the selection key thereon has not been operated for a predetermined period of time.

8. The image forming device according to claim 1, wherein the interrupt job display unit will display an interrupt job window in the uppermost position of the plurality of overlapping interrupt job windows when selected by an operator.

9. The image forming device according to claim 1, wherein the interrupt job display unit will close an interrupt job window displayed prior to a newly displayed interrupt job window when the number of overlapping interrupt job windows displayed exceeds a predetermined number.

10. The image forming device according to claim 1, wherein the interrupt job display unit will close the rearmost displayed interrupt job window of the plurality of interrupt job windows when the number of overlapping interrupt job windows displayed exceeds a predetermined number.

11. The image forming device according to claim 1, wherein the interrupt job identification table includes interrupt job data that specifies the image forming job that is going to be an interrupting job and interrupt priority data.

12. The image forming device according to claim 11, wherein the interrupt job data includes copying jobs, printing jobs, and faxing jobs.

13. The image forming device according to claim 1, wherein the interrupt job display unit includes a clear all key that closes all the interrupt job windows and cancel the interrupt jobs corresponding to the interrupt job windows and the clear all key is displayed on the interrupt job window.

* * * * *